US00RE50392E

(19) United States
(12) Reissued Patent
Box et al.

(10) Patent Number: US RE50,392 E
(45) Date of Reissued Patent: Apr. 22, 2025

(54) SEPARATING MINED MATERIAL

(71) Applicant: Technological Resources Pty. Limited, Melbourne (AU)

(72) Inventors: John Clarence Box, Perth (AU); Carly Louise Painter, Perth (AU)

(73) Assignee: TECHNOLOGICAL RESOURCES PTY LIMITED, Melbourne (AU)

(21) Appl. No.: 17/672,753

(22) Filed: Feb. 16, 2022

Related U.S. Patent Documents

Reissue of:

(64) Patent No.: 9,010,543
Issued: Apr. 21, 2015
Appl. No.: 13/701,331
PCT Filed: Jun. 2, 2011
PCT No.: PCT/AU2011/000691
§ 371 (c)(1),
(2) Date: Jan. 29, 2013
PCT Pub. No.: WO2011/150464
PCT Pub. Date: Dec. 8, 2011

(30) Foreign Application Priority Data

Jun. 2, 2010 (AU) ..... 2010902419
Sep. 30, 2010 (AU) ..... 2010904387

(51) Int. Cl.
*B07C 5/00* (2006.01)
*B07C 5/344* (2006.01)

(52) U.S. Cl.
CPC ..... *B07C 5/00* (2013.01); *B07C 5/344* (2013.01)

(58) Field of Classification Search
CPC ..... B07B 15/00; B07B 4/08; E21C 41/26; B29B 2017/0268
See application file for complete search history.

(56) References Cited

U.S. PATENT DOCUMENTS 2,717,693 A 9/1955 Holmes
3,025,961 A 3/1962 Yetterland
3,052,353 A 9/1962 Pritchett
3,908,912 A * 9/1975 Irons ..... B03B 9/005 241/20
4,231,478 A 11/1980 Stone
4,361,238 A 11/1982 Kealy et al.
4,407,415 A * 10/1983 Bohme et al. ..... 209/556
4,696,782 A 9/1987 Clayton et al.
4,702,379 A 10/1987 Clayton et al.
(Continued)

FOREIGN PATENT DOCUMENTS

AU 661713 B2 8/1995
AU 199676190 B2 4/1997
(Continued)

OTHER PUBLICATIONS

Nienhaus Karl, Bayer, Arne Kristoffer, and Riedel, Fabian, "Quality of LIF", Australia's Mining Monthly, Sep. 2023, pp. 68-71.
(Continued)

*Primary Examiner* — Sarah B McPartlin
(74) *Attorney, Agent, or Firm* — Banner & Witcoff, Ltd.

(57) ABSTRACT

A method of separating a mined material that comprises assessing the grade of successive segments of the mined material, and separating each segment on the basis of grade into a category that is at or above a grade threshold or a category that is below the grade threshold. An apparatus is also disclosed.

73 Claims, 3 Drawing Sheets

(56) References Cited

U.S. PATENT DOCUMENTS

| | | | | |
|---|---|---|---|---|
| 4,830,193 | A | 5/1989 | Clayton et al. | |
| 4,933,075 | A | 6/1990 | Nordin et al. | |
| 5,961,055 | A * | 10/1999 | Lehtinen | 241/24.14 |
| 8,931,720 | B2 * | 1/2015 | Box | E21C 41/26 241/24.1 |
| 2007/0023327 | A1 * | 2/2007 | Li | B03B 4/02 209/44 |

FOREIGN PATENT DOCUMENTS

| | | | | |
|---|---|---|---|---|
| AU | 2008100427 | | 7/2008 | |
| AU | 2008100427 | A4 | 7/2008 | |
| FR | 2 690 745 | | 11/1993 | |
| FR | 2690745 | A1 | 11/1993 | |
| GB | 1135232 | A | 12/1968 | |
| GB | 2017294 | A | 10/1979 | |
| GB | 2198242 | A | 6/1988 | |
| GB | 2 211 299 | A | 6/1989 | |
| JP | 9-38518 | | 2/1997 | |
| JP | H09-38518 | A | 2/1997 | |
| WO | 2007/051225 | A1 | 5/2007 | |
| WO | 2008/046136 | A1 | 4/2008 | |
| WO | WO 2010028446 | A1 * | 3/2010 | |
| WO | WO 2010/042994 | A1 | 4/2010 | |
| WO | 2010/094087 | A1 | 8/2010 | |
| WO | 2011/075768 | A1 | 6/2011 | |
| WO | 2011/116417 | A1 | 9/2011 | |
| WO | WO-2013006896 | A1 * | 1/2013 | B07B 13/00 |

OTHER PUBLICATIONS

Vincent, J.C., "Preconcentration of Mill Feeds Using Automated Ore Sorting Processes", Australian Institute of Mining and Metallurgy Annual Conference Proceeding, May 1980, pp. 283-295, Jan. 24, 1980.

Butel, D., Howarth, W.J, Rogis, J. and Smith, K.G. "Coal Sorting", Coal Preparation, 12:1, pp. 203-214, 1993, DOI: 10.1080/07349349308905117.

Aug. 24, 2021—(CA) Office Action—App 2,800,854.

Wills, B.A. (1992) Mineral Processing Technology, 2nd Edition, Chapter 14—Ore Sorting, Pergamon Press, ISBN: 0 08 041872 4, pp. 685-694.

Borsaru, M., et al., "Bulk Analysis using Nuclear Techniques", International Journal of Applied Radiation, vol. 34. No. 1 pp. 397 (1983).

Preconcentration applications, Mining Weekly, Jun. 26, 2009, available at http://www.miningweekly.com/article/preconcentration-2009-06-26.

Salter, J.D., "Sorting in the minerals industry: past, present and future", Minerals Engineering, vol. 4, Nos. 7-11 pp. 779-796 (1991).

Sivamohan, R., et al., "Electronic sorting and other preconcentration methods", Minerals Engineering, vol. 4, Nos. 7-11 pp. 797-814 (1991).

International Search Report issued by the Australian Patent Office in International Application No. PCT/AU2011/000691, mailed Aug. 8, 2011 (3 pages).

International Preliminary Report on Patentability issued by the Australian Patent Office in International Application No. PCT/AU2011/000691, completed May 14, 2012 (4 pages).

* cited by examiner

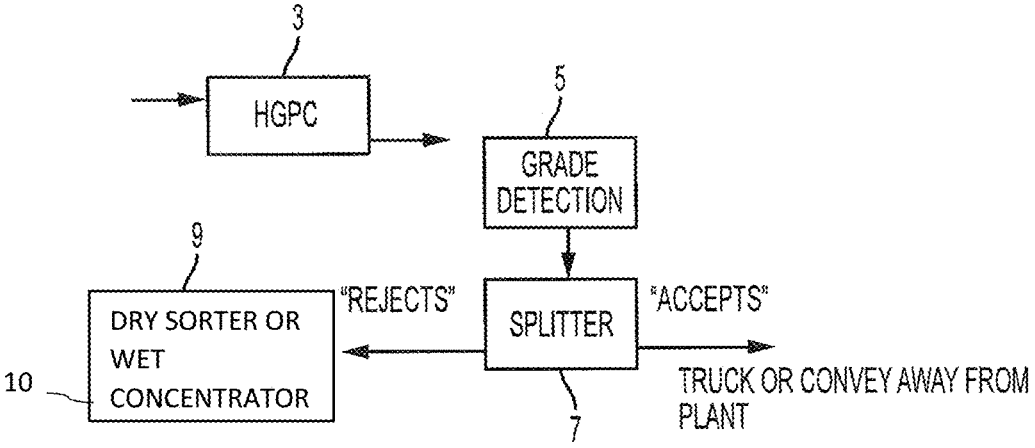
FIG. 3
AMENDED
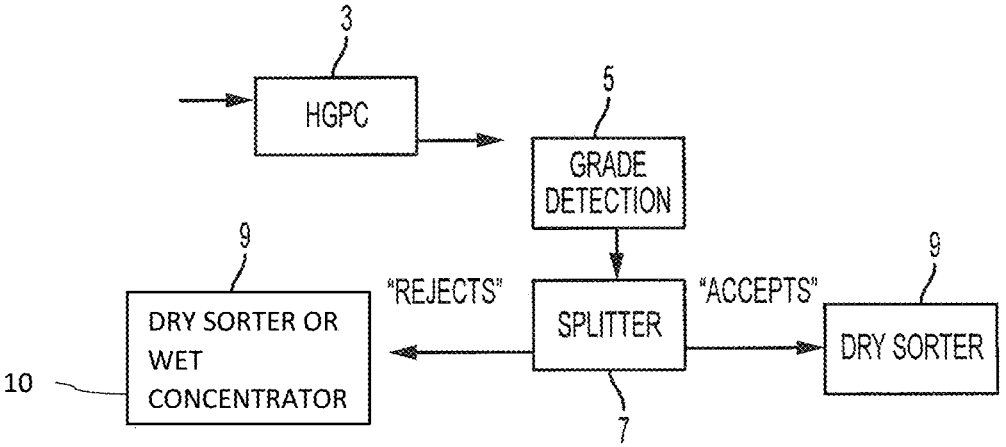
FIG. 4
AMENDED

SEPARATING MINED MATERIAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is *a reissue application of U.S. Pat. No. 9,010,543, issued Apr. 2, 2015, based on U.S. patent application Ser. No. 13/701,331, filed Jan. 29, 2013, which is* a national phase application based on PCT/AU2011/000691, filed Jun. 2, 2011, which claims the priority of Australian Patent Application No. 2010902419, filed Jun. 2, 2010, and Australian Patent Application No. 2010904387, filed Sep. 30, 2010, the content of all of which is incorporated herein by reference.

The present invention relates to a method and an apparatus for identifying and separating mined material on a bulk basis.

The present invention relates particularly, although by no means exclusively, to a method and an apparatus for identifying and separating mined material on a bulk basis and then sorting selected segments of mined material on a particle basis.

The mined material may be metalliferous or non-metalliferous material. Iron-containing and copper-containing ores are examples of metalliferous materials. Coal is an example of a non-metalliferous material.

The term "mined material" is understood herein to include (a) material that is mined and thereafter transferred to be processed in accordance with the invention and (b) material that has been mined and then stockpiled and thereafter transferred to be processed in accordance with the invention.

The present invention relates to mined material from open cut and underground mines. The following description of the invention focuses on open cut mining. Nevertheless, the invention is equally applicable to underground mining.

The present invention relates particularly although by no means exclusively to a method and an apparatus for separating iron ore.

It is known to mine iron ore in large blocks of the ore from benches. In this conventional mining operation, typically, the blocks of ore are substantial, for example 40 m long by 20 m deep by 10 m high and contain 8000 tonnes of ore. Typically, a section of a bench is assayed by chemically analysing samples of ore taken from a series of drilled holes in the section to determine whether the ore is (a) high grade, (b) low grade or (c) waste material on a mass average basis. The cut-offs between high and low grades and between low grade and waste material are dependent on a range of factors and may vary from mine to mine and in different sections of mines. When the analysis is completed, a blockout plan of the section is prepared. The plan locates the drilled samples on a plan map of the section. Regions of (a) high grade, (b) low grade or (c) waste material are determined by sample analysis (such as chemical assay and/or mineral/material type abundances) and are marked on the plan, with marked boundaries separating different regions. The boundaries are also selected having regard to other factors, such as geological factors. The regions define blocks to be subsequently mined. The blocks of ore are blasted using explosives and are picked up from a mine pit and transported from the mine pit.

The ore is processed inside and outside the mine pit depending on the grade determination for each block. For example, waste ore is used as mine fill, low grade ore is stockpiled or used to blend with high grade ore, and high grade ore is processed further as required to form a marketable product. The further processing of high grade ore ranges from simple crushing and screening to a standard size range through to processes that beneficiate or upgrade the iron ore to produce a product of a required customer specification. The processing may be wet or dry.

A significant proportion of low grade ore can remain as stockpiled ore. As a consequence, there are large stockpiles of mined ore that have been classified as low grade ore that have potentially significant economic value notwithstanding the low grade of the ore.

Low grade iron ore that has not yet been mined and low grade ore that has been mined and is in stockpiles are a potential feed material for producing upgraded ore that provides additional product tonnage from a mine.

Low grade ore can be closely associated with both high grade ore and waste material in mines. As is indicated above, at operating mines, the boundaries between blocks of high grade ore, low grade ore, and waste material are determined through the analysis of blast hole samples. The need to design blockout plans to take into account factors, such as maximising mining efficiency, means that classification of the blocks is not confined to the grades of the material in the blocks. In addition, heave during blasting and geological factors such as unfavourable dip or folding can lead to further dilution, i.e. waste material or low grade ore being incorporated into ore that has been classified as high grade ore and high grade material lost in ore classified as low grade or waste. These effects can result in the loss of reserves and unexpected variability in feed grade.

Low grade iron ore resources, including ore to be mined and stockpiled ore, can be upgraded using wet concentration and dry sorting plant flowsheets. The yield of product from these beneficiation plants is highly dependent upon the feed grade and liberation characteristics of the ores. The resulting capital and operating costs for these plants tend to be high and the costs can limit the use of these flowsheet options.

The above description is not to be taken as an admission of the common general knowledge in Australia and elsewhere.

The present invention provides a method and an apparatus for identifying and then separating a mined material that produces upgraded material by a different method and apparatus to wet concentration and dry sorting plant flowsheets known to the applicant that are mentioned above.

The present invention provides a method of separating a mined material as described herein that comprises:

(a) assessing the grade of successive segments of the mined material, and (b) separating each segment on the basis of grade into a category that is at or above a grade threshold or a category that is below the grade threshold.

The present invention also provides a method of separating a mined material as described herein that comprises:

(a) assessing the grade of successive segments of the mined material, and (b) separating each segment on the basis of grade into a category that is at or above a first grade threshold or a category that is below the first grade threshold.

The above-described method of separating segments of mined material is a different method to methods of sorting mined material that are based on assessing the grade of individual particles that are known to the applicant.

The term "segment" is understood herein to mean any bulk amount, i.e. plurality of particles, of a mined material. There is further discussion of what is meant by the term "segments" in later sections of the specification.

In this context, the term "particle" is understood in a broad sense to include, by way of example, any one or more of large and small rocks, large and small stones, and particles that can be described as dust. The particles may be any size that can be processed by the method and the apparatus.

The method may also comprise a step (c) of dry sorting particles from at least one segment and producing upgraded material.

The above-described combination of steps (a), (b), and (c) is a method of separating mined material on a bulk basis and then sorting selected segments of the mined material on a particle basis. This is a different method to methods of sorting mined material that are based solely on assessing the grade of individual particles that are known to the applicant. More particularly, the method is based on a realisation of the applicant that a combination of bulk and then particle sorting is an effective method of sorting mined material, particularly when it is necessary to sort large volumes of mined material at a high throughput and cost effectively.

The term "dry sorting" is understood herein to any upgrading process that does not required added moisture for the purpose of effecting separation.

The term "grade" is understood to herein to mean the concentration of an element of interest in an ore resource.

Dry sorting step (c) may comprise dry sorting particles from at least one segment that is above the first grade threshold and producing upgraded material that is above a second grade threshold. This dry sorting step may be appropriate, for example, where there are large amounts of low grade material and smaller amounts of higher grade material that are suitable for customer specifications and it is not an effective option, for example on a cost basis and/or a throughput basis, to dry sort all of the material or the material below the first grade threshold on a particle basis. The initial bulk sorting step identifies segments of material that are likely to have higher grade material and then focuses the particle-based dry sorting step on these selected segments and produces upgraded material. The dry sorter operates to clean the high grade material of material below the second grade threshold.

The method described in the preceding paragraph may comprise processing segments that are below the first grade threshold by processing steps other than dry sorting on a particle basis, such as by wet concentration steps, and producing upgraded material.

Dry sorting step (c) may comprise dry sorting particles from at least one segment that is below the first grade threshold and producing upgraded material that is above a second grade threshold. This dry sorting step may be appropriate, for example, where there are large amounts of medium to high grade material and smaller amounts of low grade material and it is not an effective option, for example on a cost basis and/or a throughput basis, to dry sort all of the material or the material above the first grade threshold on a particle basis. The initial bulk sorting step identifies segments of material that are likely to have medium to higher grade material that are suitable grades for customer specifications. The method then focuses the particle-based dry sorting step on the lower grade segments and produces upgraded material that, for example, has suitable grades for customer specifications. The dry sorter scavenges high grade material from the low grade material.

Dry sorting step (c) may comprise dry sorting particles from at least one segment that is above the first grade threshold and separately dry sorting particles from at least one segment that is below the first grade threshold and, in each case, producing upgraded material. In each case, the upgraded material may be above a second grade threshold.

The first and the second grade thresholds may be any suitable thresholds having regard to relevant factors for the mined material. The relevant factors may include the mineralogy of the mined material, mining costs, separation (such as dry sorting) costs, and downstream costs, including processing costs to produce a marketable product from the mined material that meets customer specifications in terms of grade and other characteristics such as particle size, and also including costs to transport that product to customers.

The first threshold grade may be a grade that meets a customer specification in terms of grade.

The second grade threshold may be higher than the first grade threshold.

The first and the second grade thresholds may be the same grade.

The grade assessment of step (a) may be a direct assessment of grade or an indirect grade assessment based on detected information that provides an indication of grade.

Assessment step (a) may comprise assessing the grade of successive segments of the mined material as the mined material is transported along a pathway.

The method may comprise transporting the mined material along the pathway on a conveyor belt or other suitable presentation system to facilitate assessment step (a).

The method may comprise transferring the mined material onto the conveyor belt and forming a bed of material on the belt.

The mined material may be material that has been mined and processed, such as by size reduction, before being supplied to the method. The mined material may be material that has been mined in surface (i.e. open cut) or underground operations. The mined material may be material that has been mined by drilling and blasting operations or by surface miners excavating material from a pit floor. The mined material may be in the form of particles having sizes that vary depending on the type of mining, the size reduction steps, the materials handling capabilities of the equipment in a mine, and the type of material (such as iron ore or another ore). As indicated above, the term "particles" is understood herein in a broad sense and includes material that can be described as any one or more than one of rocks and stones and dust. The particle size may vary from extremely small sizes up to large sizes of the order of 2-3 m. The segments may be any suitable particle size distribution.

The segments of the mined material may be any suitable amounts of material having regard to relevant factors for the mined material. The relevant factors may include the type of the mined material, such as iron ore, copper-containing ore, etc, and the capacities of the presentation, grade analysis, and separation systems to carry out the method.

The segments of the mined material may be the same size or different sizes.

The size of the segments of the mined material may be determined on the basis of the mass of the segments. For example, in the case of iron ore, the size of the segments may be at least 20 tonnes and typically at least 100 tonnes.

The size of the segments of the mined material may be determined on the basis of the amount of mined material that passes an assessment point on the pathway in a given time period. For example, in the case of iron ore, the time period may be 30 seconds, with the mined material being moved past the assessment point at rates up to 2500-3500 tonnes per hour.

The size of the segments of the mined material may be determined on the basis of the type of mining equipment being used to handle the ore. For example, in a situation where a mine operates on a drill and blast basis and material is moved by excavators and trucks, the size of the segments may be determined on the basis of the load capacity of the excavator that load mined ore into trucks and/or the load capacity of the trucks. By way of further example, in a situation where a mine operates on a surface mining basis, with the miners excavating material from a pit floor and transferring the material to in-pit conveyors, the size of the segments may be determined on the basis of the supply hoppers for the conveyors or on some other basis.

As is indicated above, separation step (b) separates each segment on the basis of grade into a category that is at or above the first grade threshold or a category that is below the first grade threshold. In a most straightforward case, this involves separating the segments into two categories. However, the present invention also extends to situations where separation step (b) separates the segments into three or more categories.

For example, separation step (b) may separate the segments into three categories of "high grade" material, "waste" material and "mixed grade" material, where the high grade material and the mixed grade material are above the first grade threshold (on a mass average basis for the segments) and the waste material is below the first grade threshold. More particularly, the mixed material is understood herein to be material that is neither primarily high grade material nor primarily low grade material but is a mixture of both high grade material and low grade material. For example, the mixed grade material may comprise 25-75% by weight high grade material. In this situation, consistent with the above description of the options for dry sorting step (c), the method may comprise separately dry sorting each of the mixed grade material and the high grade material. The method may also comprise dry sorting only one of the mixed grade material and the high grade material. In both cases, the method may comprise dry sorting the waste material.

Separation step (b) may be a dry sorting step.

The dry sorting step for sorting step (c) and separation step (b) may use any suitable analytical technique to determine the basis for sorting particles of material being processed in the sorting step.

One suitable analytical technique for the dry sorting step is dual energy x-ray analysis of particles, as described by way of example in the above-mentioned International application PCT/AU2009/001179 (International publication WO 2010/025528) in the name of the applicant. The International application describes a method and an apparatus for dual energy x-ray analysis of a mined material. The term "dual energy x-ray analysis" is understood herein to mean analysis that is based on processing data of detected transmitted x-rays through the full thickness of each particle obtained at different photon energies. Such processing makes it possible to minimise the effects of non-compositional factors on the detected data so that the data provides clearer information on the composition, type, or form of the material. The disclosure in the specification of the International application is incorporated herein by cross-reference.

Other analytical techniques for the dry sorting step include, by way of example, x-ray fluorescence, radiometric, electromagnetic, optical, and photometric techniques.

The applicability of any one or more of these (and other) techniques will depend on factors relating to a particular mine ore or a section of the mine to be mined.

The mined material may be any suitable material. For example, the mined material may be material that has been classified as a high grade ore. In such a situation, the purpose of the method is to separate waste material and low grade ore that dilutes this high grade ore. By way of further example, the mined material may be material that has been classified as a low grade ore. In such a situation, the purpose of the method is to separate high grade ore that has been incorporated into the low grade ore from the low grade ore.

The mined material may be any suitable type of material. For example, the mined material may be iron ore or a copper-containing ore. The mined material may also be a non-metalliferous material such as coal.

The method may comprise a size reduction step, for example a crushing step, on the mined material before transporting the feed material along the pathway.

The present invention also provides an apparatus for separating a mined material as described herein that comprises:

(a) a grade assessment system for assessing the grade of successive segments of the mined material, and
(b) a separation system for separating each segment on the basis of grade into a category that is at or above a grade threshold or a category that is below the grade threshold.

The present invention also provides an apparatus for separating a mined material as described herein that comprises:

(a) a grade assessment system for assessing the grade of successive segments of the mined material, and
(b) a separation system for separating each segment on the basis of grade into a category that is at or above a first grade threshold or a category that is below the first grade threshold.

The apparatus may also comprise a dry sorter for dry sorting particles from at least one segment that is above the first grade threshold and producing upgraded material.

The dry sorter may be capable of producing upgraded material that is above a second grade threshold.

The apparatus may comprise a conveyor or other presentation system for transporting the mined material along a pathway that facilitates assessment of the grade of successive segments of the mined material by the grade assessment system.

The conveyor or other presentation system may be any suitable assembly.

The grade assessment system may be any suitable system.

The separation system may be any suitable system. For example, the separation system may be a conveyor that can be moved horizontally so that a discharge end of the conveyor is positioned above storage bins for the categories of the mined material.

The dry sorter may be any suitable dry sorter, such as described in the above-mentioned International application in the name of the applicant.

The present invention also provides a method of mining that comprises:

(a) mining ore, and
(b) separating segments of the mined ore in accordance with the above-described mining method.

The method may also comprise dry sorting separated segments of the mined ore in accordance with the above-described mining method.

The method may also comprise one or more downstream processing steps to process the separated and optionally dry sorted material to produce a product that meets a customer specification in terms of grade and other characteristics, such as particle size. These other method steps may comprise size reduction and/or blending steps.

The present invention is described further by reference to the accompanying drawings, of which:

FIG. 3 is a flowsheet of another embodiment of the method and the apparatus of the invention;

FIG. 4 is a flowsheet of another embodiment of the method and the apparatus of the invention.

Figure 1:
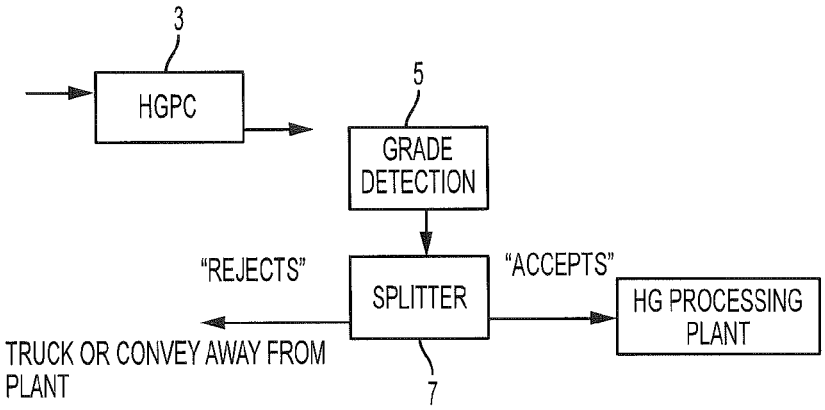
FIG. 1 is a flowsheet of one embodiment of the method and the apparatus of the invention.

The embodiments of the invention shown in FIGS. 1 to 5 are described herein in the context of a mined material in the form of iron ore. The invention is not confined to iron ore and extends to other mined materials that contain valuable material. The invention also extends to processing mined material produced by underground mining.

The method of the present invention comprises assessing the grade of each successive segment of a mined material, typically at least 5 tonnes per segment, that is being transported along a pathway, such as on a conveyor belt or other suitable presentation system on a bulk basis, and separating the segments based on the grade assessment. The separated segments may fall into any one of the following categories: waste material, a product, and material suitable for downstream processing to produce a product. This bulk assessment of mined material contrasts with other separation methods, such as dry sorting methods, which are based solely on sorting individual particles.

Embodiments of the method of the present invention comprise transferring selected segments to a downstream processing plant.

One example of a downstream processing plant is a beneficiation plant.

Another example of a downstream processing plant is a dry sorter. More particularly, embodiments of the method of the present invention comprise further sorting selected and in some instances all segments of the material. This subsequent sorting step comprises the use of a dry sorter that sorts the segments on a particle basis. Depending on the circumstances, the selected segments may be segments that are above a grade threshold. In other situations, the selected segments may be segments that are below the grade threshold. In other situations, all of the segments may be dry sorted on a particle basis, with the criteria for sorting being different for segments above and below the grade threshold. This combination of bulk and then particle sorting is an effective method of sorting when it is necessary to sort large volumes of material at a high throughput and cost effectively.

The method of the present invention provides opportunities for (a) rejecting waste material dilution and low grade ore dilution in a product or a feed to a downstream processing plant such as a beneficiation plant (such as a dry sorter) and (b) recovering high grade ore which has been misplaced in low grade ore or waste material. Both opportunities may apply to the rehandling of existing low grade stockpiles or to material as it is mined.

The feed material for the method may be mined by any suitable mining method and equipment. For example, the material may be mined by drilling and blasting blocks of ore from a pit and transporting the mined ore from the pit by trucks and/or conveyors. By way of further example, the material may be mined by surface miners moving over a pit floor and transported from the pit by trucks and/or conveyors. The mined material may be mined material that has been crushed. Sorting could also be done in the pit in conjunction with an in-pit crushing plant, prior to material being transported out of the pit.

In more general terms, the method of the present invention comprises assessing the mined feed material in terms of grade and other criteria, configuring the settings for the bulk separation and optionally dry sorting steps having regard to the assessment, and then processing the material through the bulk separation and optionally dry sorting steps and producing upgraded material.

Two criteria for the feed material that are important, although not essential, for the bulk sorting step of the embodiments shown in the Figures are as follows:

The feed material contains enough misplaced material for the sorting method to create value. In this context, "misplaced" material means material that would otherwise be classified as waste material or low grade material.

The ore is heterogeneous to a degree that enables sorting based on segments of material to effectively separate the misplaced material.

With reference to the FIG. 1, mined or stockpiled iron ore is crushed in a high grade primary crusher (HGPC) circuit 3. The primary crusher circuit 3 may be an in-pit circuit or a circuit that is outside the pit.

The crushed ore is transferred from the primary crusher circuit 3 as a feed material to a grade assessment assembly 5. The grade assessment assembly 5 comprises a transfer conveyor belt that transports a bed of the iron ore along the belt to a discharge end and a grade detection system positioned to assess the grade of the iron ore at a location along the length of the belt. In this particular embodiment, the grade detection system continuously detects the grade of iron ore throughout the depth and across the width of the bed of ore on the transfer conveyor belt as the belt passes the detection location. The grade detection system assesses the average grade of successive segments of the iron ore on the transfer conveyor belt. In this particular embodiment, the segments are the amounts of iron ore that pass the detection location in each 30 second period. The invention is not confined to this time period and to this basis for selecting the size of a segment. The amount of iron ore in each segment is a function of the belt speed and the amount of ore on each part of the transfer conveyor belt along the length of the belt that passes the detection location in the 30 second period. The grade detection system assesses whether the average grade of each successive segment of the iron ore is above or below a first threshold grade value. The grade detection system may be any suitable system.

A range of options for grade detection have been evaluated by the applicant. These options fall into two categories.

Those which analyse the entire bed depth of the ore.

Those which analyse the surface of the iron ore bed only.

These two groups are significant in terms of selecting the most appropriate detection system.

One grade detection option is Prompt Gamma Neutron Activation Analysis (PGNAA), for the following reasons:

- Commercially available, minimising development requirements and risk.
- Proven in iron ore operations.
- High probability of satisfactory detection at primary crushed ore particle size and conveyor bed depth.
- Elemental analysis rather than mineralogical/phase analysis aligns well with current grade control methods and enables simple data analysis and control logic.

The iron ore that is discharged from the transfer conveyor belt of the grade assessment assembly 5 is transferred to a sorter 7 in the form of a splitter system that directs segments of iron ore that are at or above the first grade threshold into a first chute (not shown) and segments of iron ore that are below the grade threshold into a second chute (not shown).

The material in the first chute is shown in FIG. 1 as an "Accepts" feed. This material may be a product specification or a feed for a downstream processing plant such as a beneficiation plant, such as a wet processing plant or a dry processing plant, to produce a product. The material in the second chute is shown in FIG. 1 as a "Rejects" material that is transported away from the sorter 7 and stockpiled or used as landfill.

One embodiment of the splitter system (not shown) is two transfer chutes extending from a single cavity that receives iron ore that is discharged from the transfer conveyor belt. This is mounted on a rail system, and the splitter can be moved by a series of double acting hydraulic rams to divert the ore stream into either chute. Feed conveyors for the rejects and the dry sorter feed sit beneath each chute.

Another, although not the only other, embodiment of the splitter system is a conveyor belt that is positioned below the discharge end of the transfer conveyor belt to receive iron ore from this belt and can be moved horizontally so that a discharge end of the conveyor is be positioned above storage bins for the rejects and the dry sorter feed.

By way of example, drivers for the design of the sorter 7 include the following factors:

- It is preferable that the speed of movement be fast enough to enable the destination to be changed with minimal misplacement. This means that the time for change over must be equal to or less than the time taken for the ore to travel from the detector to the splitter system.
- In the case of iron ore, it is preferable that the splitter system be robust enough to handle up 2000 tonnes/hour of primary crushed material with maintenance requirement (mean time between failures and mean time for repairs) better than the requirements for the existing primary crusher and conveyor system.

Figure 2:
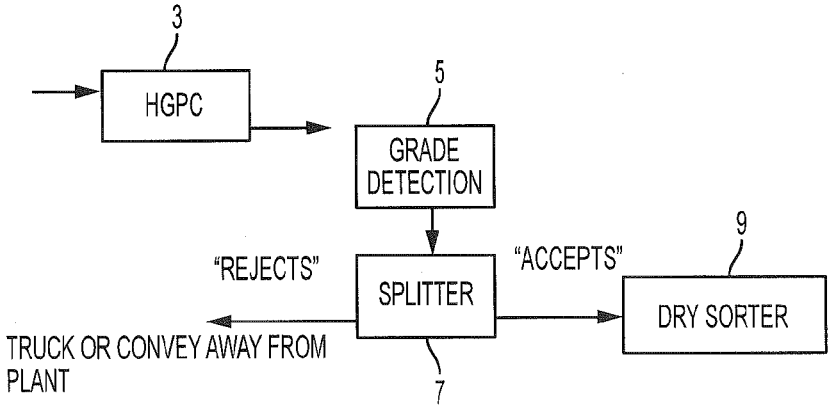
FIG. 2 is a flowsheet of another embodiment of the method and the apparatus of the invention.

The embodiment shown in FIG. 2 is similar in some respects to the embodiment shown in FIG. 1 and the same reference numerals are used to describe the same features.

The main difference between the embodiments is that FIG. 2 includes a specific downstream processing plant for the "Accepts" feed from the sorter 7.

As shown in FIG. 2, the material in the "Accepts" feed from the sorter 7 is supplied to a downstream processing plant in the form of a dry sorter 9, and the particles are dry sorted on the basis of ore grade, i.e. average composition, of the particles into two fractions. More particularly, the dry sorter 9 sorts the mined material in each selected segment that makes up the material in the first chute on a particle by particle basis. The dry sorter 9 determines whether each particle is above or below a second threshold grade and sorts the particles into one of two fractions based on this assessment. Depending on the circumstances, the second grade may be higher than or the same as the first threshold grade for the bulk sorting step. The dry sorter 9 may be any suitable dry sorter. One suitable dry sorter is a sorter that uses dual x-ray analysis or any other suitable analytical technique to determine ore grade. One fraction comprises ore that has an iron concentration above the second threshold grade, for example 63 wt. % Fe. This fraction is a required product fraction, in terms of composition, and forms a basis for a marketable product or a product that can be blended with other ore streams to produce a marketable product. The other fraction comprises ore that has an iron concentration below the second threshold ore grade, for example 63 wt. % Fe. This fraction is transferred to a stockpile to be used, for example, as land fill.

As shown in FIGS. 1 and 2, the material in the second chute of the sorter 7 is transferred away from the sorter 7 as a "Rejects" material. The material may be stockpiled or used as landfill.

Depending on a range of factors, including the physical characteristics and the mineralogy of the particles, the "Rejects" material in FIGS. 1 and 2 may be suitable for upgrading cost effectively via a processing option other than dry sorting in the dry sorter 9. By way of particular example, the material may be suitable for upgrading via a wet concentration process. In that event, instead of being classified as a waste material, the material may be processed in a wet concentration circuit to produce upgraded material that is a suitable grade for a customer specification.

The embodiment shown in FIG. 3 is similar in some respects to the embodiment shown in FIG. 2 and the same reference numerals are used to describe the same features.

With reference to FIG. 3, the grade of the "Accepts" material in the first chute of the sorter 7 is a suitable grade for a customer specification and is transferred to be processed further as may be required to be suitable for a product to meet a customer specification. The further processing may include size reduction and/or blending with other material. The grade of the "Rejects" material in the second chute of the sorter 7 is below a grade for a customer specification. The material is transferred to a dry sorter 9 of the same type as described above in relation to FIG. 2 *or wet concentrator 10* and is sorted to produce an upgraded material that suitable in terms of grade for a customer specification.

The embodiment shown in FIG. 4 is similar in some respects to each of the embodiments shown in FIGS. 1 and 2 and the same reference numerals are used to describe the same features.

The FIG. 4 embodiment is a combination of the FIGS. 2 and 3 embodiments in that the material from the chutes of the sorter 7 is transferred to separate dry sorters 9. In this embodiment, the sorting criteria for the dry sorters 9 are different, although in each case the dry sorters produce an upgraded material.

Figure 5:
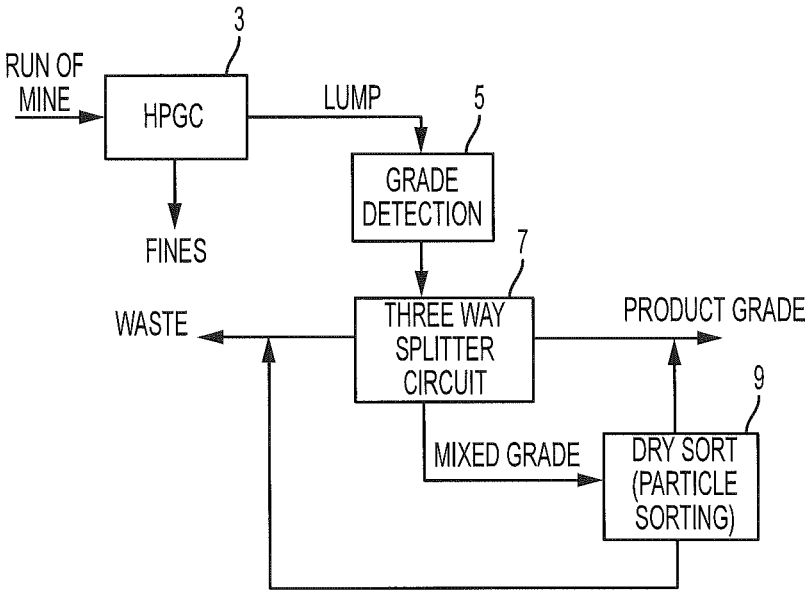
FIG. 5 is a flowsheet another, although not the only other, embodiment of the method and the apparatus of the invention.

The embodiment shown in FIG. 5 is similar in some respects to each of the embodiments shown in FIGS. 1 to 3 and the same reference numerals are used to describe the same features.

The FIG. 5 embodiment comprises a sorter 7 that operates on a different basis to the sorter 7 of the embodiments shown in FIGS. 1 to 3. Specifically, instead of a sorter 7 that comprises a splitter system that sorts the segments into two categories, the FIG. 4 embodiment sorts the segments into three categories. More particularly, the iron ore that is discharged from the grade assessment assembly 5 is transferred to a sorter 7 in the form of a splitter system that directs (a) segments of iron ore that are at or above the first grade threshold into a "mixed grade" chute (not shown), (b)

segments that are at or above a second grade threshold into a "high grade" chute, and (c) segments that are below the first grade threshold and are "waste" material into another chute (not shown). In this embodiment, the second grade threshold is a product grade that meets a customer specification and is above the first grade threshold. It is not necessary to process the high grade material further from the viewpoint of grade control. The mixed grade material comprises a range of grades from below the second grade threshold to above the second grade threshold. This material is transferred to a dry sorter 9 and is separated on a particle basis into a product grade fraction and a waste fraction. The product fraction is combined with the high grade material and the waste fraction is combined with the waste material from the sorter 7.

Many modifications may be made to the embodiment of the method and the apparatus described above without departing from the spirit and scope of the invention.

The invention claimed is:

1. A method of separating a mined material comprising:

(a) assessing [the] *a* grade of successive segments of the mined material, wherein each segment is at least 5 tonnes, and (b) separating each segment on the basis of *the* grade into a category that is at or above a first grade threshold or a category that is below the first grade threshold;

(c) separating particles from at least one segment that is above the first grade threshold and producing upgraded material that is above a second grade threshold.

2. The method defined in claim 1 wherein the separating in step (c) is dry sorting.

3. A method of separating a mined material comprising:

(a) assessing [the] *a* grade of successive segments of the mined material, wherein each segment is at least 5 tonnes, (b) separating each segment on the basis of grade into a category that is at or above a first grade threshold or a category that is below the first grade threshold, and (c) processing segments that are below the first grade threshold by processing steps other than dry sorting on a particle basis and producing upgraded material.

4. The method defined in claim 2 wherein separating step (c) [further] comprises dry sorting particles from at least one segment that is below the first grade threshold and producing upgraded material that is above a second grade threshold.

5. The method defined in claim 2 wherein separating step (c) comprises dry sorting particles from at least one segment that is above the first grade threshold and separately dry sorting particles from at least one segment that is below the first grade threshold and, in each case, producing upgraded material that is above the second grade threshold.

6. The method defined in claim 5 wherein the first [threshold] grade *threshold* is a grade that meets a customer specification in terms of grade.

7. The method defined in claim 6 wherein the second grade threshold is higher than the first grade threshold.

8. The method defined in claim 6 wherein the first and the second grade thresholds are the same[grade].

9. The method defined in claim 1 wherein *assessing* the grade [assessment of] *in* step (a) is a direct assessment of grade.

10. The method defined in claim 1 wherein *assessing* the grade [assessment of] *in* step (a) is an indirect grade assessment based on detected information that provides an indication of grade.

11. The method defined in claim 1 wherein *assessing the* grade [assessment] *in* step (a) comprises assessing the grade of successive segments of the mined material as the mined material is transported along a pathway.

12. The method defined in claim 11 [that] comprises transporting the mined material along the pathway on a conveyor belt [or other suitable presentation system] to facilitate [assessment] *assessing the grade in* step (a).

13. The method defined in claim 12 [that] comprises transferring the mined material onto the conveyor belt and forming a bed of material on the conveyor belt.

14. The method defined in claim 1 [wherein the] *comprises determining a* size of the segments of the mined material [is determined] on the basis of [the] *a* mass of the segments.

15. The method defined in claim 1 wherein[, in the case of iron ore, the] *a* size of the segments is at least 20 tonnes.

16. A method of separating a mined material comprising:

(a) assessing [the] *a* grade of successive segments of the mined material, wherein each segment is at least 5 tonnes, and (b) separating each segment on the basis of *the* grade into a category that is at or above a first grade threshold or a category that is below the first grade threshold;

wherein [the] *a* size of the segments [of the mined material] is determined on the basis of [the] *an* amount of mined material that passes an assessment point on [the] *a* pathway in a given time period.

17. The method defined in claim 16 wherein[, in the case of iron ore,] the given time period is 30 seconds.

18. The method defined in claim 1 wherein [the] *a* size of the segments of the mined material is determined on the basis of [the] *a* load capacity of an excavator that loads mined ore into trucks after a drilling and blasting operation in a pit.

19. The method defined in claim 1 wherein [separation] *separating* step (b) separates each segment on [the] *a* basis of grade into three or more categories.

20. The method defined in claim 19 wherein [separation] *separating* step (b) separates the segments into three categories of ["high grade"] *high grade* material, ["waste"] *waste* material and ["mixed grade"] *mixed grade* material, where the high grade material and the mixed grade material are above the first grade threshold [(on] *on* a mass average basis for the [segments)] *segments* and the waste material is below the first grade threshold.

21. The method defined in claim 20 wherein the mixed grade material is a mixture of both high grade material and low grade material.

22. The method defined in claim 21 wherein the mixed grade material comprises 25-75% by weight high grade material.

23. The method defined in claim 1 wherein [separation] *separating* step (b) is a dry sorting step.

24. An apparatus for separating a mined material that comprises:

(a) a grade assessment system for assessing [the] *a* grade of successive segments of the mined material, wherein each segment is at least 5 tonnes, (b) a separation system for separating each segment on the basis of *the* grade into a category that is at or above a first grade threshold or a category that is below the first grade threshold, and (c) a [separator] *separation system* for separating particles from at least one segment that is above the first grade threshold and producing upgraded material.

25. The apparatus defined in claim 24 wherein the [separator] *separation system* (*c*) is a dry sorter.

26. The apparatus defined in claim 25 wherein the dry sorter is capable of producing upgraded material that is above a second grade threshold.

27. A method of mining [that] comprises (a) mining ore, and (b) separating segments of the mined ore in accordance with the method defined in claim 1.

28. The method defined in claim 27 [that] comprises dry sorting separated segments of the mined ore.

29. The method defined in claim 27 [that] comprises [one or more downstream processing steps to process the] *processing* separated [material or the dry sorted material] *segments in one or more downstream processing steps* to produce a product that meets a customer specification in terms of grade and other characteristics[, such as particle size].

30. The method defined in claim 3 where in the processing steps other than dry sorting on a particle basis include wet concentration steps.

*31. A method of separating a mined material in a form of copper-containing ore comprising:*

*(a) assessing a copper grade of successive segments of the mined material as the mined material is transported along a pathway, wherein each segment is at least 5 tonnes,*

*(b) separating each segment on the basis of copper grade into a category that is at or above a first grade threshold or a category that is below the first grade threshold, and*

*(c) processing segments that are below the first grade threshold in a wet processing plant and producing upgraded material.*

*32. The method defined in claim 31 wherein assessing the grade in step (a) is a direct assessment of copper grade.*

*33. The method defined in claim 31 wherein assessing the grade in step (a) is an indirect assessment of copper grade.*

*34. The method defined in claim 31 further comprises reducing a size of the mined material in a size reduction step before assessing the grade in step (a).*

*35. The method defined in claim 31 where the processing step (c) includes wet concentration steps.*

*36. An apparatus for separating a mined material in the form of copper-containing ore that comprises:*

*(a) a grade assessment system for assessing a copper grade of successive segments of the mined material as the copper-containing ore is transported along a pathway, wherein each segment is at least 5 tonnes,*

*(b) a separation system for separating each segment on the basis of copper grade into a category that is at or above a first grade threshold or a category that is below the first grade threshold, and*

*(c) a separation system for separating particles from at least one segment that is above the first grade threshold and producing upgraded material.*

*37. The apparatus defined in claim 36 further comprising a crusher for crushing copper-containing ore before the ore is transferred to the grade assessment system (a).*

*38. The apparatus defined in claim 36 comprises a splitter system for splitting segments that are at or above the first grade threshold into one chute and segments that are below the first grade threshold into another chute.*

*39. A method of mining that comprises*

*(a) mining ore,*

*(b) reducing a size of mined ore in a crushing step and producing a crushed ore;*

*(c) assessing a grade of successive segments of the crushed ore by direct assessment of the grade as the crushed ore is transported along a pathway, wherein each segment is at least 5 tonnes, and*

*(d) separating each segment of the crushed ore on the basis of grade of the segment into a category that is at or above a first grade threshold or a category that is below the first grade threshold; and*

*(e) separating particles from at least one separated segment that is above the first grade threshold and producing upgraded material that is above a second grade threshold in a downstream processing plant.*

*40. The method defined in claim 39 wherein separating step (d) includes dry sorting the segment.*

*41. The method defined in claim 39 wherein separating step (e) comprises processing particles from at least one separated segment by wet processing in a wet processing plant.*

*42. The method defined in claim 39 wherein separating step (e) comprises processing particles from at least one separated segment by dry sorting particles.*

*43. The method defined in claim 39 further comprises processing at least one separated segment that is below the first grade threshold by processing steps other than dry sorting on a particle basis and producing upgraded material that is above a second grade threshold.*

*44. The method defined in claim 39 further comprises dry sorting particles from at least one separated segment that is below the first grade threshold and producing upgraded material that is above a second grade threshold.*

*45. The method defined in claim 39 wherein separating step (e) comprises dry sorting particles from at least one separated segment that is above the first grade threshold and separately dry sorting particles from at least one segment that is below the first grade threshold and, in each case, producing upgraded material that is above a second grade threshold.*

*46. The method defined in claim 39 wherein the mined ore is iron ore.*

*47. The method defined in claim 46 wherein the iron ore is low grade iron ore.*

*48. The method defined in claim 47 wherein the low grade iron ore is a mixture of high grade and waste iron ore.*

*49. The method defined in claim 39 wherein assessing the grade in step (c) comprises transporting the crushed ore along the pathway as a bed of material on a conveyor belt.*

*50. The method defined in claim 49 wherein assessing the grade in step (c) comprises assessing the grade of successive segments of the crushed ore by analyzing the entire bed depth.*

*51. The method defined in claim 39 wherein grade assessment step (c) comprises assessing the grade of successive segments of the crushed ore by Prompt Gamma Neutron Analysis (PGNA).*

*52. The method defined in claim 39 wherein size reducing step (b) is a primary crushing step producing the crushed ore having a primary crushed ore particle size.*

*53. The method defined in claim 39 comprising stockpiling mined ore before size reducing step (b).*

*54. A method of separating a mined ore comprising:*

*(a) reducing a size of mined ore in a crushing step and producing a crushed ore;*

*(b) assessing a grade of successive segments of the crushed ore by direct assessment of the grade as the crushed ore is transported along a pathway, wherein each segment is at least 5 tonnes,*

*(c) separating each segment of the crushed ore on the basis of grade of the segment into a category that is at*

*or above a first grade threshold or a category that is below the first grade threshold; and*

(*d*) *separating particles from at least one separated segment that is above the first grade threshold and producing upgraded material that is above a second grade threshold in a downstream processing plant.*

*55. The method defined in claim 54 wherein separating step (c) includes dry sorting the segment.*

*56. The method defined in claim 54 wherein separating step (d) comprises processing particles from at least one separated segment by wet processing particles in a wet processing plant.*

*57. The method defined in claim 54 wherein separating step (d) comprises processing particles from at least one separated segment by dry sorting particles.*

*58. The method defined in claim 54 wherein separating step (d) comprises dry sorting particles from at least one separated segment that is above the first grade threshold and producing upgraded material that is above a second grade threshold.*

*59. The method defined in claim 54 further comprises processing at least one separated segment that is below the first grade threshold by processing steps other than dry sorting on a particle basis and producing upgraded material that is above a second grade threshold.*

*60. The method defined in claim 54 further comprises dry sorting particles from at least one separated segment that is below the first grade threshold and producing upgraded material that is above a second grade threshold.*

*61. The method defined in claim 54 wherein the mined ore is iron ore.*

*62. The method defined in claim 61 wherein the iron ore is low grade iron ore.*

*63. The method defined in claim 62 wherein the low grade iron ore is a mixture of high grade and waste iron ore.*

*64. The method defined in claim 54 wherein assessing the grade in step (b) comprises transporting the crushed ore along the pathway as a bed of material on a conveyor belt.*

*65. The method defined in claim 64 wherein assessing the grade in step (b) comprises assessing the grade of successive segments of the crushed ore by analyzing the entire bed depth.*

*66. The method defined in claim 54 wherein assessing the grade in step (b) comprises assessing the grade of successive segments of the crushed ore by Prompt Gamma Neutron Analysis (PGNA).*

*67. The method defined in claim 54 wherein size reducing step (a) is a primary crushing step producing a crushed ore having a primary crushed ore particle size.*

*68. The method defined in claim 54 comprising transferring mined ore from a stockpile to size reducing step (a).*

*69. An apparatus for separating a mined ore that comprises:*

(*a*) *a crusher for crushing mined ore to crushed ore;*

(*b*) *a grade assessment system for assessing a grade of successive segments of the crushed ore by direct assessment as the crushed ore is moved along a pathway, wherein each segment is at least 5 tonnes,*

(*c*) *a separation system for separating each segment of the crushed ore on the basis of grade into a category that is at or above a first grade threshold or a category that is below the first grade threshold, and*

(*d*) *a separation system for separating particles from at least one segment that is above the first grade threshold and producing upgraded material.*

*70. The apparatus defined in claim 69 wherein the separation system for separating particles is a dry sorter.*

*71. The apparatus defined in claim 69 wherein the separation system for separating particles is a wet processing plant.*

*72. The apparatus defined in claim 69 wherein the crusher includes a primary crusher for crushing mined ore to a primary crushed ore particle size.*

*73. The apparatus defined in claim 69 includes a splitter system for splitting segments that are at or above the first grade threshold into one chute and segments that are below the first grade threshold into another chute.*

* * * * *